(No Model.) 2 Sheets—Sheet 2.
H. McCALIP & M. M. NYE.
CAR BRAKE.
No. 289,921. Patented Dec. 11, 1883.
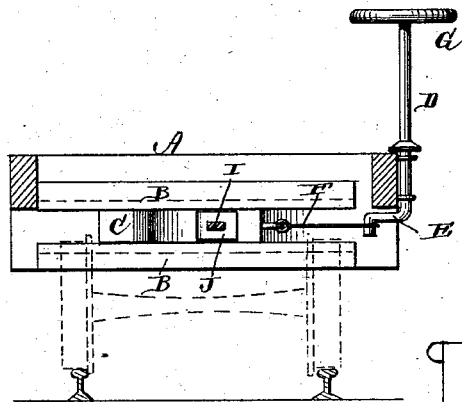
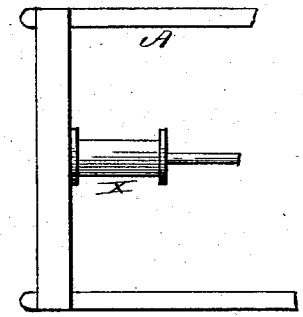
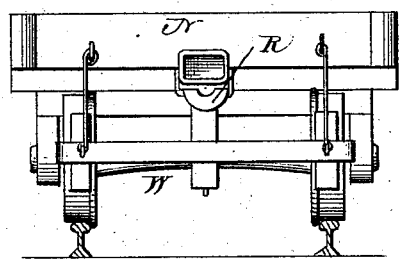
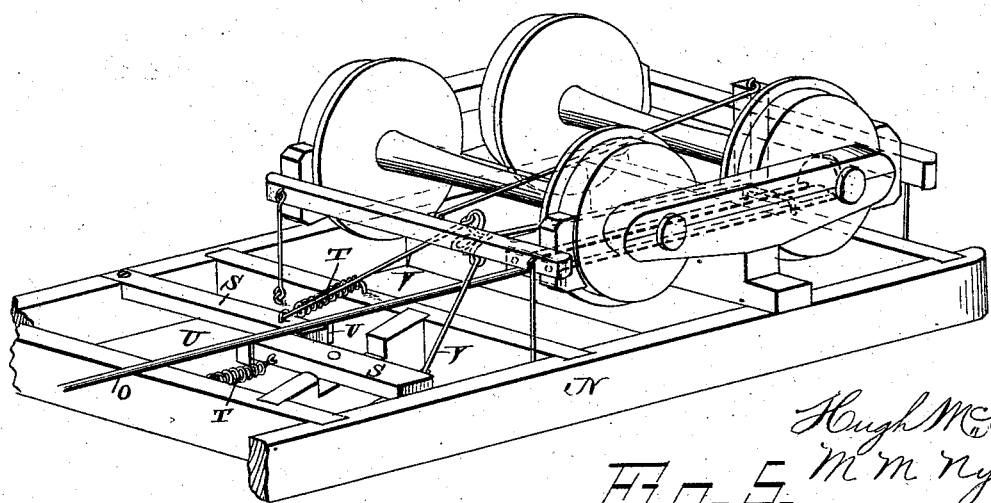
WITNESSES
F. L. Ourand
J. R. Littell
INVENTORS
Hugh McCalip
M. M. Nye
by C. A. Snow & Co.
Attorneys.

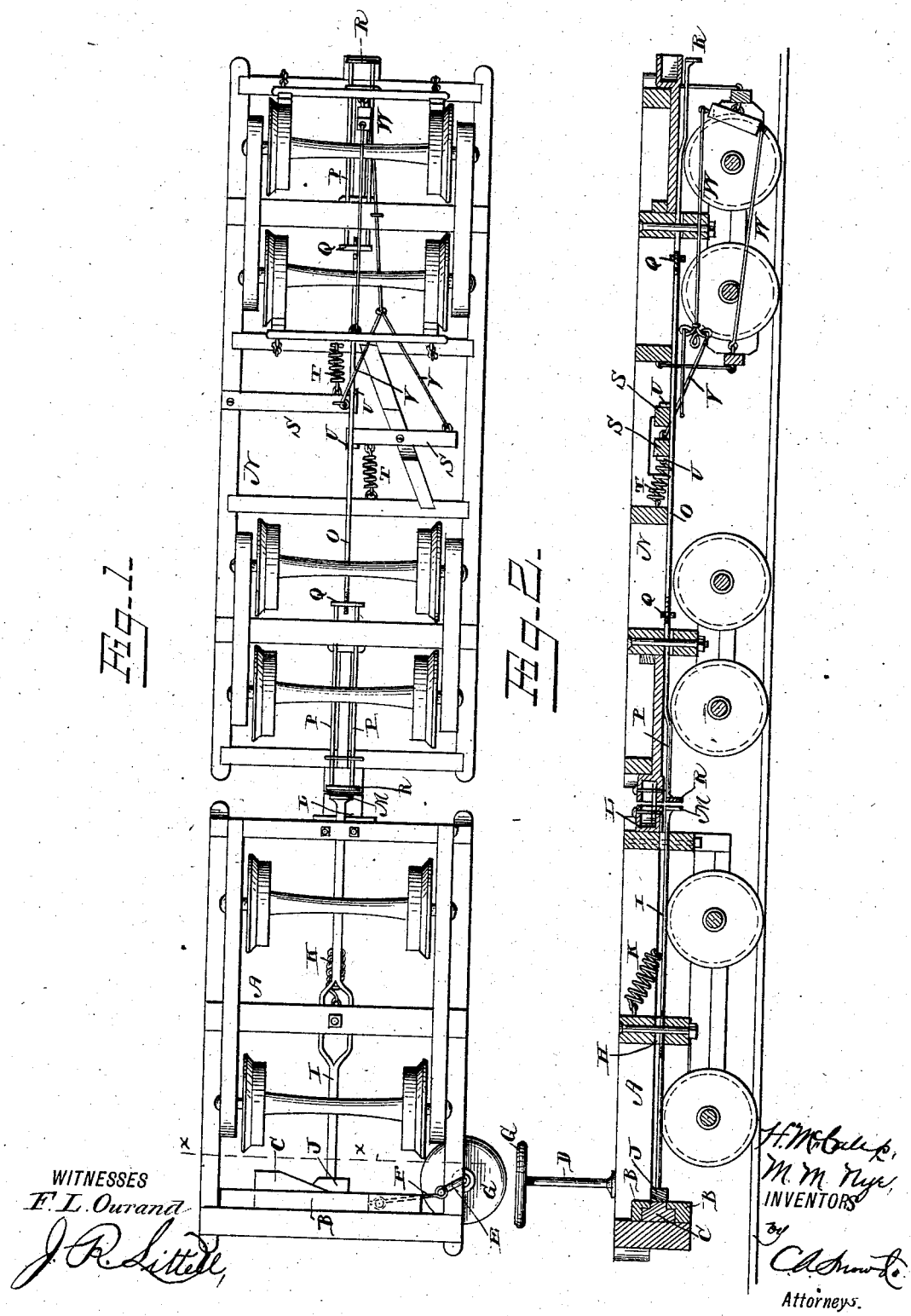

UNITED STATES PATENT OFFICE.

HUGH McCALIP AND MARSHALL M. NYE, OF CRAWFORDSVILLE, INDIANA.

CAR-BRAKE.

SPECIFICATION forming part of Letters Patent No. 289,921, dated December 11, 1883.

Application filed August 23, 1883. (No model.)

*To all whom it may concern:*

Be it known that we, HUGH McCALIP and MARSHALL M. NYE, citizens of the United States, residing at Crawfordsville, in the county of Montgomery and State of Indiana, have invented a new and useful Car-Brake, of which the following is a specification, reference being had to the accompanying drawings.

This invention relates to car-brakes, and has for its object to provide means whereby when the brakes are "set" upon the tender or front car of a train the motion shall be immediately communicated to the brake mechanism of all the remaining cars throughout the train, and the brakes be instantly and automatically set upon all the cars, and likewise whereby the brakes may be automatically released upon all the cars of the train by simply releasing the brakes upon the front car or tender.

With these ends in view our invention consists in the improved construction and arrangement of parts, which will be hereinafter fully described, and particularly pointed out in the claims.

In the drawings hereto annexed, Figure 1 is a bottom view of the tender-truck and the truck of a car equipped with our improvement. Fig. 2 is a longitudinal vertical sectional view of the same. Fig. 3 is a transverse vertical sectional view taken through the tender-truck on the line *x x* in Fig. 1. Fig. 4 is an end view of one of the cars equipped with our improvement. Fig. 5 is a detail view of part of the brake mechanism of one of the cars, and Fig. 6 is a detail view illustrating a modification.

The same letters refer to the same parts in all the figures.

A in the drawings designates the truck of the tender, which is provided at its front end with guides B B, forming bearings for a transversely-sliding wedge-shaped block, C.

D is a vertical shaft, mounted or journaled in suitable bearings at the side of the truck, and having at its lower end a crank, E, connected by a pitman, F, with the small or narrow end of the wedge-shaped block. The upper end of the shaft D may be provided with a hand-wheel, G, or any other suitable means may be employed for communicating motion to the said shaft D when required.

The bolsters of the truck A are mortised, as at H, so as to admit a longitudinally-sliding rod, I, having at its front end a block or shoe, J, which is held in contact with the wedge C by the action of a spring, K, connecting the rod I with one of the bolsters. The rear end of rod I extends under the draw-head or buffer L, and terminates about on a line with the latter, where it is provided with a vertical buffer-plate, M.

N designates the truck of an ordinary car, which is provided with bearings on its under side for a longitudinally-sliding rod, O, to each end of which a pair of rods, P P, are connected by means of a plate, Q, as shown. The ends of the rods P P project at the ends of the car-truck, where they terminate about on a line with the draw-heads, and are provided with buffer-plates R.

Pivoted to the under side of the truck N, about centrally under the same, are levers S S, the inner ends of which are drawn in opposite directions by suitably-arranged coiled springs, T T. The inner ends of the said levers rest against projections U, extending upwardly from the rod O, as shown. The levers S are connected by pivoted rods V with the brake mechanism, which is denoted by the letter W. In the general construction of the brake mechanism no novelty is herein claimed.

The operation of this invention will be readily understood from the foregoing description, taken in connection with the drawings hereto annexed. In order to set the brakes upon the train, it is only necessary to rotate the shaft D, thereby causing the wedge C to force the rod I in a rearward direction. This motion is communicated to the rod O of the next car, and thence to the brake mechanism.

Fig. 6 of the drawings illustrates a modification of our invention, which consists in substituting for the operating-wedge C a steam-cylinder, X, which is directly connected with the operating-rod. The operation of this modification is obvious.

We claim as our invention and desire to secure by Letters Patent of the United States—

1. The combination of the brake mechanism, the rod O, plates Q Q, rods P P, levers S S, springs T T, projections U, connecting-rods V, and suitable operating mechanism, as set forth.

2. The combination, with a train of cars, of the rods arranged to slide longitudinally under the car-trucks, levers, and pivoted rods connecting the said sliding rods with the brake mechanism, buffer-plates at the ends of said sliding rods, a transversely-sliding wedge arranged to operate one of the sliding rods, and operating mechanism, substantially as set forth.

In testimony that we claim the foregoing as our own we have hereto affixed our signatures in presence of two witnesses.

HUGH McCALIP.
MARSHALL M. NYE.

Witnesses:
ELI COMPTON,
GEO. R. BROWN.